(12) United States Patent
Suzuki

(10) Patent No.: US 6,508,137 B2
(45) Date of Patent: Jan. 21, 2003

(54) CAPACITANCE CHANGE-BASED INPUT DEVICE AND DETECTION DEVICE

(75) Inventor: Katsutoshi Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/804,826

(22) Filed: Mar. 13, 2001

(65) Prior Publication Data

US 2001/0022108 A1 Sep. 20, 2001

(30) Foreign Application Priority Data

Mar. 14, 2000 (JP) .................................. 2000-070886
Mar. 14, 2000 (JP) .................................. 2000-070888

(51) Int. Cl.[7] ............................................. G01D 7/100
(52) U.S. Cl. ................................................ 73/862.043
(58) Field of Search ..................... 73/862.043, 861.24, 73/724, 718, 504.09, 514.36, 504.02; 361/283

(56) References Cited

U.S. PATENT DOCUMENTS 5,421,213 A    6/1995  Okada ................... 73/862.043
6,003,371 A *  12/1999 Okada ................... 73/504.02

* cited by examiner

Primary Examiner—Max Noori
(74) Attorney, Agent, or Firm—Brinks Hofer Gilson & Lione

(57) ABSTRACT

An input device and detection device each have separate electrodes with one electrode for detecting input in a vertical direction and a plurality of electrodes for detecting input in a horizontal direction. An elastic body has a conductive portion opposite to the electrodes with a thin portion opposite to the vertical-detection electrode. A storage depressed portion is formed on the thin portion. A space between the elastic body and the electrodes changes by input. A slider is connected to the elastic body and is movable only in a horizontal direction, a hard pressing body stored in the storage depressed portion of the elastic body, and a key top opposite to the pressing body and vertically movable. When the slider is moved horizontally, the elastic body deforms and the space between the conductive portion of the elastic body and the horizontal-detection electrodes changes, and when the key top is pressed, the thin portion of the elastic body deforms through the pressing body and the space between the thin portion and the vertical-detection electrode changes.

7 Claims, 11 Drawing Sheets

CAPACITANCE CHANGE-BASED INPUT DEVICE AND DETECTION DEVICE

BACKGROUND OF THE INVENTION

1. Field of the Invention

The present invention relates to an input device for use in personal computers and remote controllers and to a detection device for use in accelerometers and, particularly, to a capacitance change-based input device and detection device.

2. Description of the Prior Art

Various input devices which make use of a change in capacitance have been proposed as an input device and detection device (both to be referred to as "input device" hereinafter) for inputting and detecting the physical amount of force or the like in such industries as auto industry, electric industry, machine industry and engineering industry because they do not need temperature compensation.

However, as this type of input devices cannot distinguish horizontal direction (X and Y directions) force applied to an operation unit from vertical direction (Z direction) force applied to the operation unit, they have such a defect as low input accuracy when the operation unit is pressed obliquely.

SUMMARY OF THE INVENTION

It is an object of the present invention to provide an input device and a detection device which eliminate the above defect of the prior art and have high input accuracy (detection accuracy) and excellent handling ease.

According to a first aspect of the present invention, there are provided a capacitance change-based input device and detection device, each comprising:

separate electrodes comprised of a first electrode for detecting input in a vertical direction and a plurality of electrodes, for example, second to fifth electrodes for detecting input in a horizontal direction and arranged separately on the surface;

an elastic body which faces the above separate electrodes with a predetermined space therebetween, at least a portion opposite to the separate electrodes having conductivity, a thin portion being provided opposite to the electrode for detecting input in a vertical direction, a storage depressed portion being formed on the thin portion, and the space between the elastic body and the separate electrodes changing by input;

a slider connected to the elastic body and movable only in a horizontal direction;

a hard pressing body stored in the storage depressed portion of the elastic body; and a key top whose portion opposite to the pressing body is movable at least in a vertical direction, wherein when the slider is moved in a horizontal direction, the elastic body deforms and the space between the conductive portion of the elastic body and the electrodes for detecting input in a horizontal direction changes, and when the key top is pressed, the thin portion of the elastic body deforms through the pressing body and the space between the thin portion and the electrode for detecting input in a vertical direction changes.

According to a second aspect of the present invention, there are provided a capacitance change-based input device and detection device each of which has a tension application means such as an annular projection, or cutout portion or inclined portion to apply tension to the elastic body.

According to a third aspect of the present invention, there are provided a capacitance change-based input device and detection device, wherein a connection portion between the elastic body and the slider is covered with the key top.

According to a fourth aspect of the present invention, there are provided a capacitance change-based input device and detection device, each comprising:

separate electrodes comprised of a first electrode for detecting input in a vertical direction and a plurality of electrodes, for example, second to fifth electrodes for detecting input in a horizontal direction and arranged separately on the surface;

an elastic body which faces the above separate electrodes with a predetermined space therebetween, at least a portion opposite to the separate electrodes having conductivity, and the space between the elastic body and the electrodes changing by input;

a slider connected to the elastic body and movable only in a horizontal direction; and a key top whose portion opposite to the electrode for detecting input in a vertical direction is movable in a vertical direction through the elastic body, wherein when the slider is moved in a horizontal direction, the elastic body deforms and the space between the conductive portion of the elastic body and the electrodes for detecting input in a horizontal direction changes, and when the key top is pressed, the elastic body deforms and the space between the conductive portion of the elastic body and the electrode for detecting in a vertical direction changes.

According to a fifth aspect of the present invention, there are provided a capacitance change-based input device and detection device each of which has a tension application means such as an annular projection, or cutout portion or inclined portion is provided to apply tension to the elastic body.

According to a sixth aspect of the present invention, there are provided a capacitance change-based input device and detection device, wherein a connection portion between the elastic body and the slider is covered with the key top.

DETAILED DESCRIPTION OF THE PREFERRED EMBODIMENTS

Figure 1:
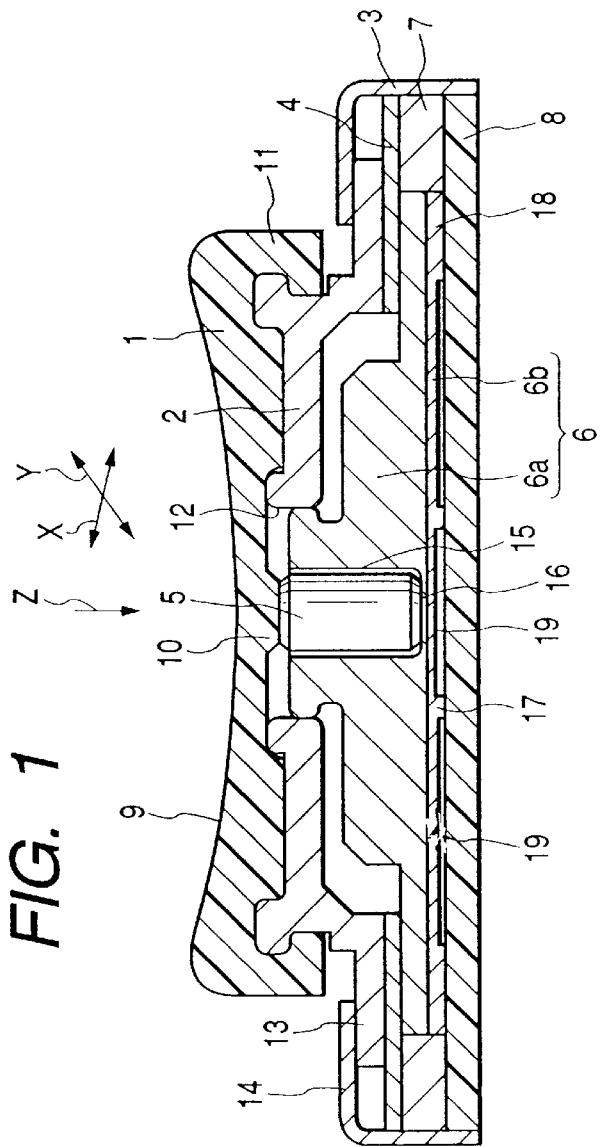
FIG. 1 is a sectional view of an input device according to a first embodiment of the present invention.
Figure 2:
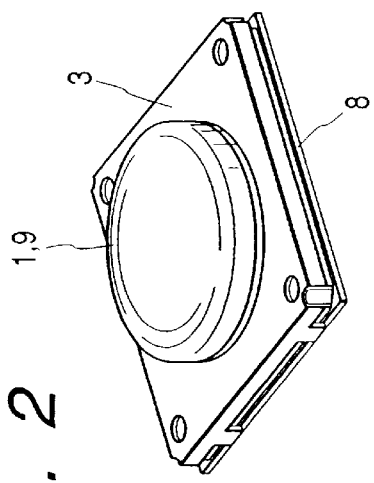
FIG. 2 is a perspective view of the above input device.
Figure 3:
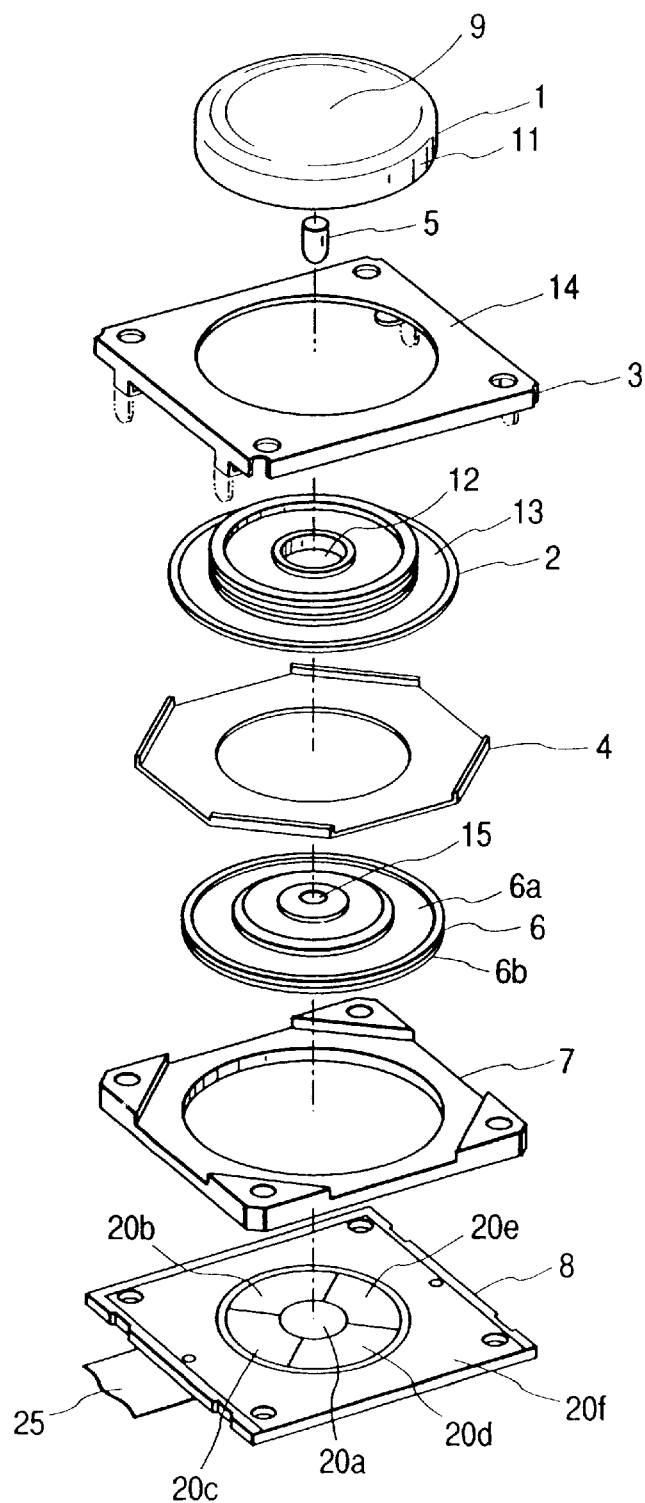
FIG. 3 is an exploded perspective view of the above input device.
Figure 4:
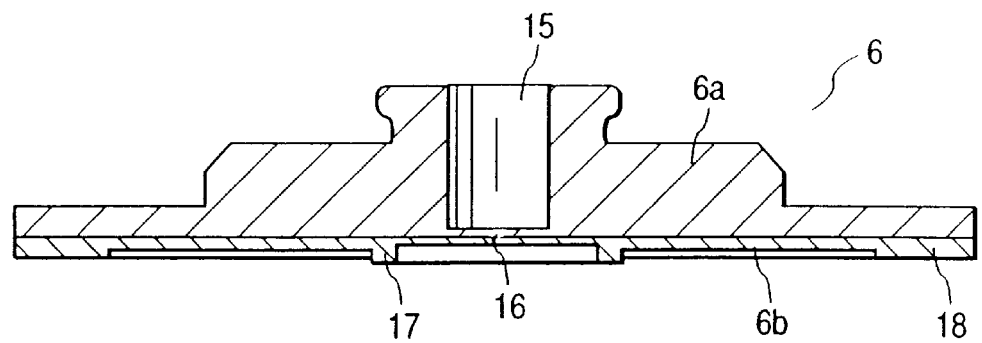
FIG. 4 is a sectional view of an elastic body used in the above input device.
Figure 5:
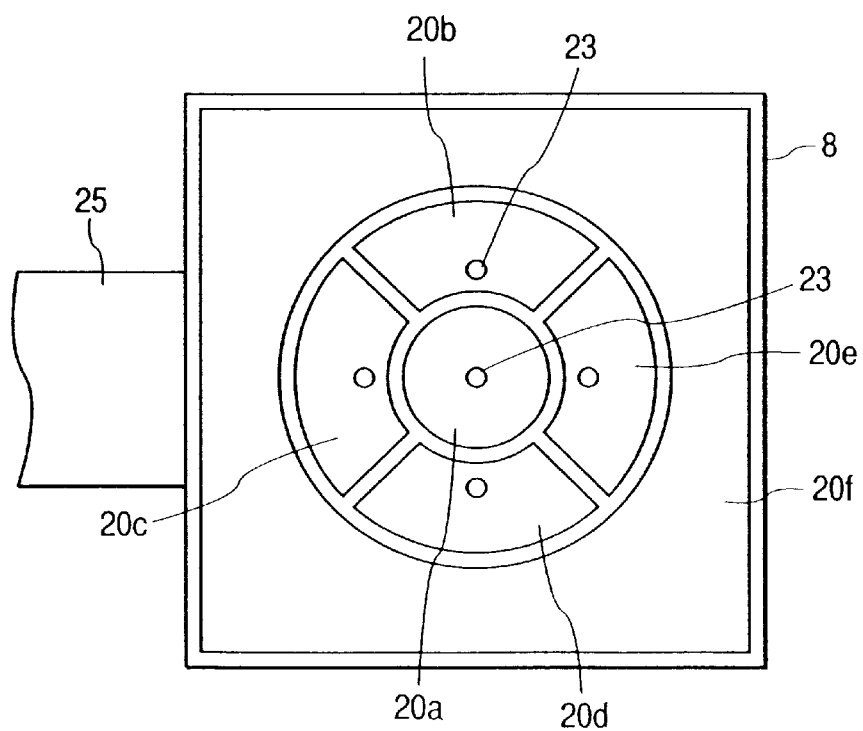
FIG. 5 is a plan view of a printed wiring board used in the above input device.
Figure 6:
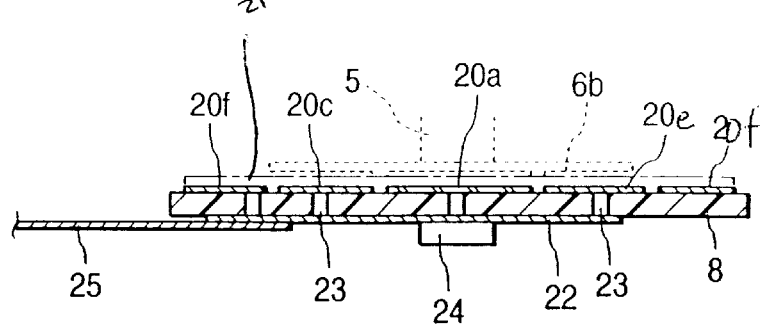
FIG. 6 is a sectional view of the above printed wiring board.

Preferred embodiments of the present invention will be described hereinafter with reference to FIGS. 1 to 6. FIG. 1 is a sectional view of an input device, FIG. 2 is a perspective view of the input device, FIG. 3 is an exploded perspective view of the input device, FIG. 4 is a sectional view of an elastic body used in the input device, FIG. 5 is a plan view of a printed wiring board, and FIG. 6 is a sectional view of the printed wiring board.

The input device is essentially comprised of a key top 1, slider 2, housing 3 made of a metal plate, bracket 4 made of a metal plate, pressing body 5, elastic body 6, a support member 7 made of a synthetic resin molded product and printed wiring board 8.

The key top 1 is molded to a shape shown in FIG. 1 from an elastic material such as rubber or elastomer and an input operation surface 9 which is greatly depressed in a circular arc is formed on the center portion of the top surface. As shown in FIG. 1, a projection portion 10 which is thinner than the peripheral portion and can move vertically is provided on the center portion in such a manner that it faces down and a lower end side wall 11 is mated with the slider 2.

The slider 2 is molded from a hard synthetic resin, a hole 12 which mates with the head portion of the elastic body 6 is formed in the center portion, and a connection portion between this slider 2 and the elastic body 6 is covered with the key top 1 mounted to the top of the slider 2. A flange portion 13 provided at the periphery of the slider 2 is sandwiched between the bracket 4 and the upper end bent portion 14 of the housing 3 in such a manner that it can slide. Therefore, the slider 2 is arranged such that it can move in a horizontal direction (X and Y directions), the key top 1 can move in a horizontal direction (X and Y directions) together with the slider 2, and the center portion (projection portion 10) can move in a vertical direction (Z direction).

The elastic body 6 comprised of an elastic main body 6a which is relatively thick and has no conductivity and a conductive elastic body 6b arranged under the elastic main body 6a. The both members are integrated with each other by such means as two-color molding or adhesion. As shown in FIG. 4, a storage depressed portion 15 having a larger inner diameter than the outer diameter of the pressing body 5 is formed in the center portion of the elastic main body 6a and a thin portion 16 is formed at the bottom of the storage depressed portion 15 to store the pressing body 5 in the storage depressed portion 15 such that it can move vertically. The pressing body 5 is made from a hard material such as a hard synthetic resin or metal and columnar in shape.

The conductive elastic body 6b is made from an elastic material such as rubber or elastomer containing conductive fine particles such as silver or carbon black dispersed therein, and an annular projection 17 larger in diameter than the thin portion 16 projects downward and slightly more than the peripheral portion 18 of the conductive elastic body 6b.

The peripheral portion 18 of the elastic body 6 (conductive elastic body 6b) is fixed and positioned to the printed wiring board 8 by adhesion or the like, the annular projection 17 of the conductive elastic body 6b is press contacted to the top surface of the printed wiring board 8, and a space 19 is maintained between the conductive elastic body 6b and the printed wiring board 8 while tension is applied to the conductive elastic body 6b.

On the top surface of the hard printed wiring board 8 made from glass-epoxy resin, as shown in FIG. 5, a first electrode 20a is formed at the center, a second electrode 20b, third electrode 20c, fourth electrode 20d and fifth electrode 20e are formed around the first electrode 20a, a gland electrode 20f is provided around the above electrodes, all the above electrodes 20 are covered with a soft insulating film 21 for maintaining a space therebetween as shown in FIG. 6, and the areas of the second to fifth electrodes 20b to 20e are equal to one another. In FIG. 1, the electrodes 20 and the insulating film 21 are omitted to simplify the illustration.

Application examples of the input device will be described later. In this embodiment, the second electrode 20b is for moving a cursor on a display in an upward direction, the third electrode 20c for moving the cursor in a downward direction, the fourth electrode 20d for moving the cursor in a left direction, and the fifth electrode 20e for moving the cursor in a right direction. The second to fifth electrodes 20b to 20e are for inputting data in a horizontal direction (X and Y directions). The first electrode 20a is used to confirm the input direction and to input data in a vertical direction (Z direction).

A conductive pattern 22 having a predetermined shape is provided on the under surface of the printed wiring board 8 and the above electrodes 20 are electrically connected to the conductive pattern 22 by through holes 23. An electronic part such as an IC chip 24 is mounted on the conductive pattern 22, a flexible printed wiring board 25 is connected to one end of the conductive pattern 22, and the other end of the flexible printed wiring board 25 is connected to the input/output interface (not shown) of an apparatus in use.

A description is given of the operation of this input device. In a stand-by mode (initial state) where force is not applied to the key top 1, spaces between the conductive elastic body 6b and the electrodes 20b to 20e on the printed wiring board 8 are equal to one another and capacitances between the conductive elastic body 6b and the electrodes 20b to 20e are therefore equal to one another. Since tension is applied to the conductive elastic body 6b, the pressing body 5 in the storage depressed portion 15 of the elastic main body 6a is lifted by the tension of the conductive elastic body 6b and contacts or approaches the projection portion 10, and a predetermined space 19 is maintained between the center portion of the conductive elastic body 6b and the first electrode 20a.

Since the flange portion 13 of the slider 2 which is mated with the key top 1 is sandwiched between the bracket 4 and the upper end bent portion 14 of the housing 3 as described above, the peripheral portion (slider 2) of the key top 1 is prevented from moving in a vertical direction (Z direction) and allowed to move only in a horizontal direction (X and Y directions).

When the key top 1 is moved to the left in FIG. 1, for example, this movement is transmitted to the elastic body 6 through the slider 2, the elastic body 6 is elastically deformed, the space between the conductive elastic body 6b and the second electrode 20b is narrowed from the initial state by this deformation, a chance in capacitance on the second electrode 20b side is electrically detected, and the input of a signal for moving the cursor in a left direction by means of the key top 1 can be detected.

When the key top 1 is moved to the right in FIG. 1, for example, this movement is transmitted to the elastic body 6 through the slider 2, the elastic body 6 is elastically deformed, the space between the conductive elastic body 6b and the fifth electrode 20e is narrowed from the initial state by this deformation, a change in capacitance on the fifth electrode 20e side is electrically detected, and the input of a signal for moving the cursor in a right direction by means of the key top 1 can be detected.

When the center portion (projection portion 10) of the key top 1 is pressed down by the finger in a vertical direction (Z direction), the center portion of the conductive elastic body 6b is directly pressed by the pressing body 5, the space between the first electrode 23a and the conductive elastic body 6b is narrowed from the initial state, a change in capacitance is electrically detected, and a signal is input. When operation force applied to the key top 1 is removed, the key top 1, slider 2, pressing body 5 and elastic body 6 are returned to the original stand-by mode by the restoring force of the elastic body 6.

Figure 7:
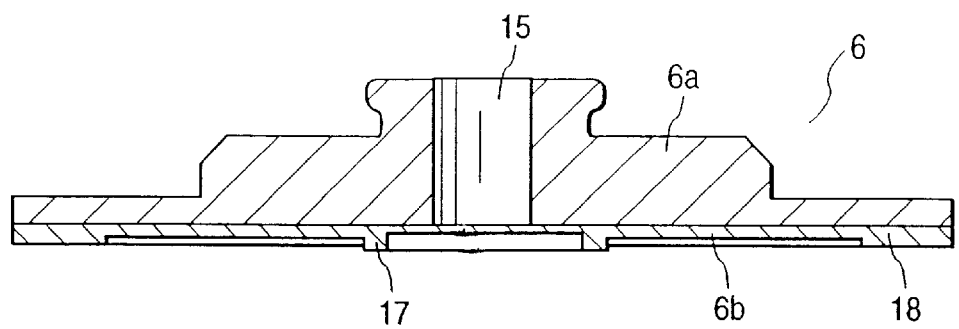
FIG. 7 is a sectional view of an elastic body used in a second embodiment of the present invention.

FIG. 7 is a sectional view of the elastic body 6 used in a second embodiment. The difference of the elastic body 6 from the elastic body 6 of a first embodiment is that the thin portion 16 is not provided on the elastic main body 6a, a hole is formed in the elastic main body 6a, and an opening at the lower end of the hole is covered by the center portion of the conductive elastic body 6b to form the storage depressed portion 15.

Figure 8:
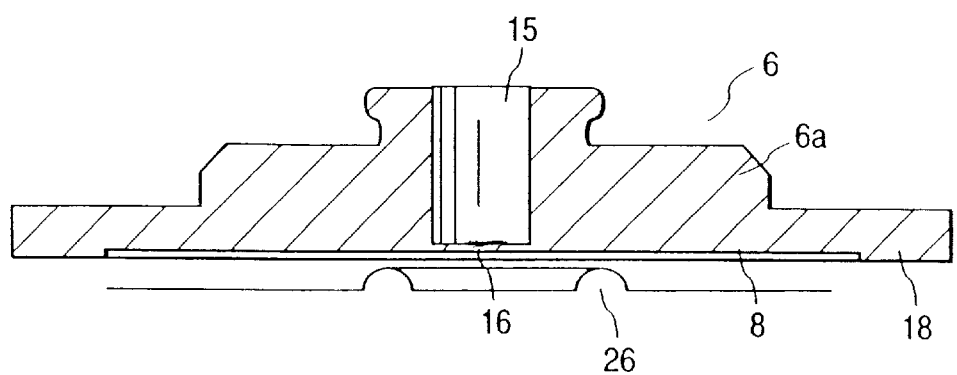
FIG. 8 is a sectional view of an elastic body used in a third embodiment of the present invention.

FIG. 8 is a sectional view of the elastic body 6 used in a third embodiment. The whole elastic body 6 is comprised of the conductive elastic body 6b and the storage depressed portion 15 and the thin portion 16 are formed at the center portion. In this example, the annular projection 17 is not provided on the elastic body 6 and an annular projection 26 slightly larger in diameter than the thin portion 16 is formed on the printed wiring board 8. The annular projection 26 is designed to be slightly larger in height than the inner level difference of the peripheral portion 18 of the conductive elastic body 6b and press contacted to the under surface of the conductive elastic body 6b when the device is assembled to apply appropriate tension to the conductive elastic body 6b.

The formation of the annular projection 26 on the printed wiring board 8 is applicable to the first and second embodiments.

Figure 9:
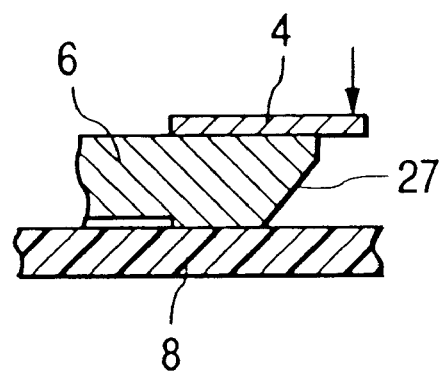
FIG. 9 is a sectional view of key parts of an input device according to a fourth embodiment of the present invention.

FIG. 9 is a sectional view of key parts of an input device according to a fourth embodiment. An inclined or round cutout portion 27 is formed at the periphery of the under surface of the elastic body 6. When this elastic body 6 is set in the device, the cutout portion 27 is smashed by pressing force at the time of assembly (FIG. 9 does not illustrate the smashed cutout portion 27), whereby tension (stress) is generated in the elastic body 6.

Figure 10:
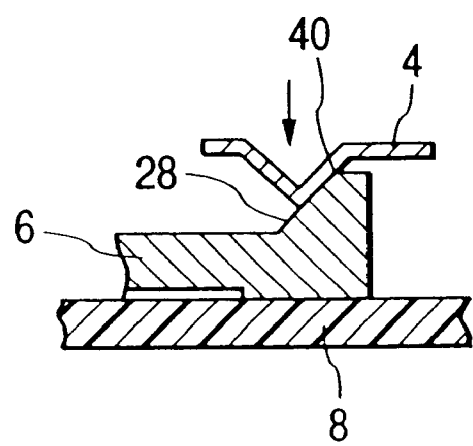
FIG. 10 is a sectional view of key parts of an input device according to a fifth embodiment of the present invention.

FIG. 10 is a sectional view of key parts of an input device according to a fifth embodiment. A wide-angle inclined portion 28 whose diameter increases toward the upper end is formed on the end portion of the top surface of the elastic body 6, and a V-shaped bent pressing portion 40 is provided on a pressing member such as the bracket 4 to press the inclined portion 28 outward in a radial direction. The inclined portion 28 is pressed outward in a radial direction by the pressure of this pressing portion 40 to generate tension (stress) in the elastic body 6.

Figure 11:
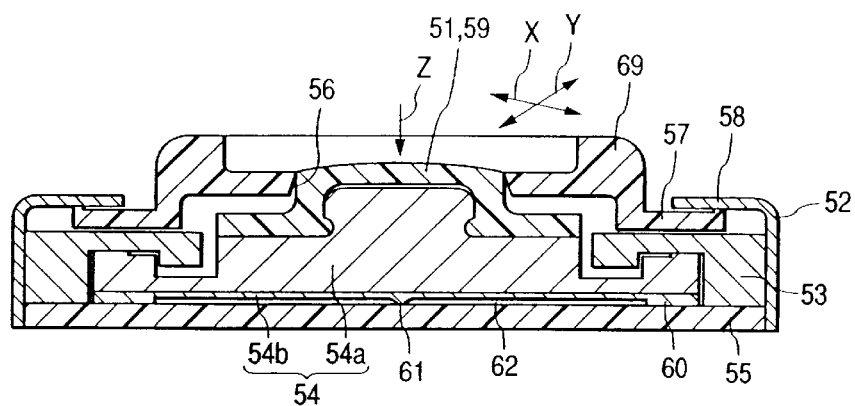
FIG. 11 is a sectional view of an input device according to a sixth embodiment of the present invention.
Figure 12:
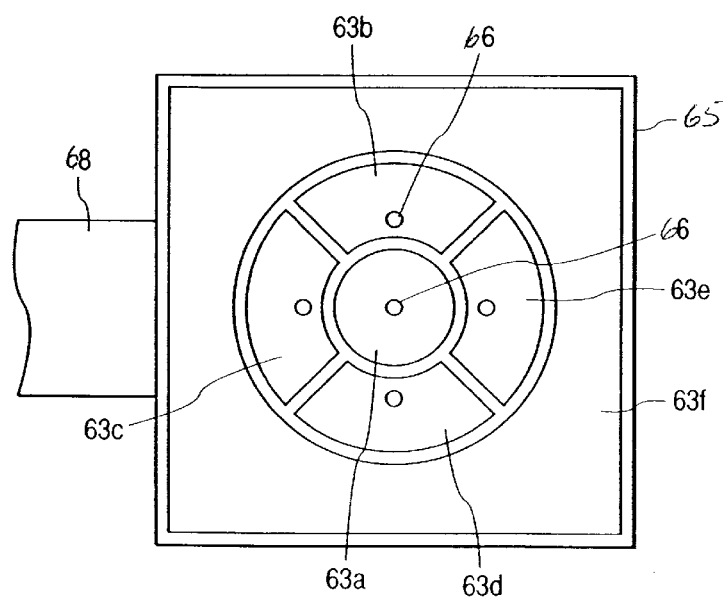
FIG. 12 is a plan view of a printed wiring board used in the above input device.
Figure 13:
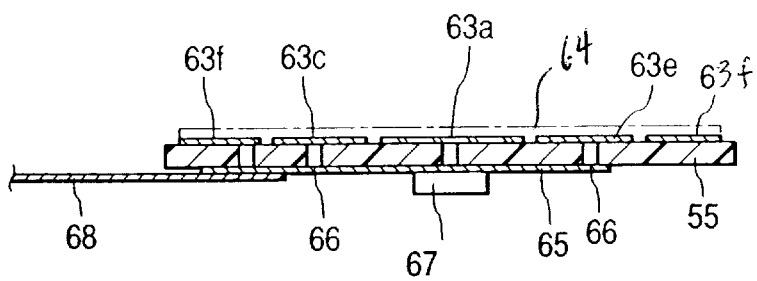
FIG. 13 is a sectional view of the above printed wiring board.

A description is subsequently given of a sixth embodiment of the present invention with reference to the accompanying drawings. FIG. 11 is a sectional view of an input device, FIG. 12 is a plan view of a printed wiring board and FIG. 13 is a sectional view of the printed wiring board.

The input device is essentially comprised of a slider 69 which also serves as a key top, key top 51, housing 52 made of a metal plate, a support member 53 made of a synthetic resin molded product, elastic body 54 and printed wiring board 55.

The slider 69 is molded to a shape shown in FIG. 11 from a hard synthetic resin, a hole 56 which mates with the head portion 59 of the key top 51 is formed in the center portion, and a flange portion 57 at the periphery is mounted on the support member 53 such that it can move in a horizontal direction (X and Y directions) between the upper end bent portion 58 of the housing 52 and the support member 53.

The key top 51 is molded to a shape shown in FIG. 11 from an elastic material such as rubber or elastomer, and the head portion 59 is exposed to the outside from the hole 56 and mated with the elastic body 54. The key top 51 can move in a horizontal direction (X and Y directions) together with the slider 69 and can move alone in a vertical direction (Z direction).

The elastic body 54 comprised of an elastic main body 54a which is relatively thick and has no conductivity and a conductive elastic body 54b which is arranged under the elastic main body 54a. The both members are integrated with each other by such means as two-color molding or adhesion. The conductive elastic body 54b is made from an elastic material such as rubber or elastomer containing conductive fine particles such as silver or carbon dispersed therein. The peripheral portion 60 of the elastic body 54 is fixed or positioned to a printed wiring board 55 by adhesion or the like, a projection 61 for applying tension which is contacted to the printed wiring board 55 is provided at the center of the under surface of the conductive elastic body 54b, and a space 62 is formed between the conductive elastic body 54b and the printed wiring board 55 by the peripheral portion 60 and the projection 61.

On the top surface of the hard printed wiring board 55 made from glass-epoxy resin, for example, as shown in FIG. 12, a first electrode 63a is formed at the center, second electrode 63b, third electrode 63c, fourth electrode 63d and fifth electrode 63e are formed around the first electrode 63a, and a gland electrode 63f is provided around the above electrodes, and the above electrodes 63 are covered with a soft insulating film 64 for maintaining a space therebetween as shown in FIG. 13, and the areas of the second to fifth electrodes 63b to 63e are equal to one another.

In the sixth embodiment, the second electrode 63b is for moving the cursor on the display in an upward direction, the third electrode 63c for moving it in a downward direction, the fourth electrode 63d for moving it in a left direction, and the fifth electrode 63e for moving it in a right direction. The second to fifth electrodes 63b to 63e are for inputting data in a horizontal direction (X and Y directions). The first electrode 63a is used to confirm the input direction and to input data in a vertical direction (Z direction).

A conductive pattern 65 having a predetermined shape is provided on the under surface of the printed wiring board 55 and the above electrodes 63 are electrically connected to the conductive pattern 65 by through holes 66. An electronic part such as an IC chip 67 is mounted on the conductive pattern 65, a flexible printed wiring board 68 is connected to one end of the conductive pattern 65, and the other end of the flexible printed wiring board 68 is connected to the input/output interface (not shown) of an apparatus in use.

A description is given of the operation of this input device. In a stand-by mode (initial state) where force is not applied to the key top 51 and the slider 69, spaces between the conductive elastic body 54b and the electrodes 63b to 63e on the printed wiring board 55 are equal to one another and capacitances between the conductive elastic body 54b and the electrodes 63b to 63e are therefore equal to one another.

Since the flange portion 57 of the slider 69 is sandwiched between the support member 53 and the upper end bent portion 58 of the housing 52 when the slider 69 is operated, the slider 69 is prevented from moving in a vertical direction (Z direction) and allowed to move only in a horizontal direction (X and Y directions).

When the slider 69 is moved to the left in FIG. 11, for example, this movement is transmitted to the elastic body 54 through the key top 51, the elastic body 54 is elastically deformed slightly, the space between the conductive elastic body 54b and the third electrode 63c is narrowed from the initial state by this deformation, a chance in capacitance on the third electrode 63c side is electrically detected, and the input of a signal for moving the cursor in a left direction by means of the slider 69 can be detected.

When the slider 69 is moved to the right in FIG. 11, for example, the elastic body 54 is elastically deformed slightly by this movement, the space between the conductive elastic body 54b and the fifth electrode 63e is narrowed from the initial state, a change in capacitance on the fifth electrode 63e side is electrically detected, and the input of a signal for moving the cursor in a right direction by means of the slider 69 can be detected.

When the key top 51 is pressed in a vertical direction (Z direction) by the finger in FIG. 11, the slider 69 is kept at that position and only the key top 51 is moved down. The space between the first electrode 63a and the conductive elastic body 54b is narrowed from the initial state, a change in capacitance is electrically detected, and a signal is input by the key top 51. When operation force applied to the key top 51 and the slider 69 is removed, the key top 51, slider 69 and elastic body 54 are returned to the original stand-by mode by the restoring force of the elastic body 54.

Figure 14:
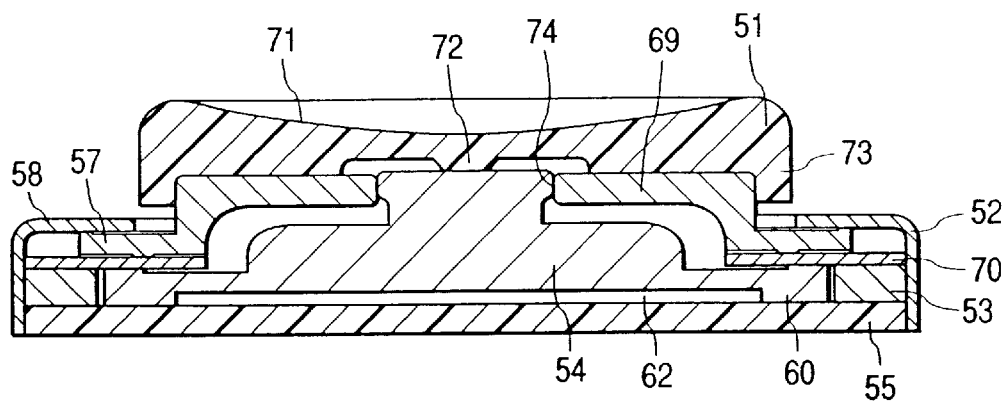
FIG. 14 is a sectional view of an input device according to a seventh embodiment of the present invention.
Figure 15:
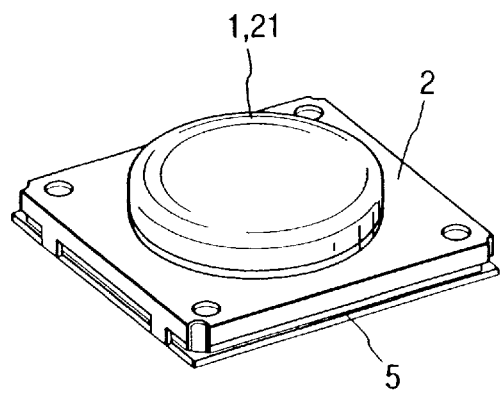
FIG. 15 is a perspective view of the above input device.
Figure 16:
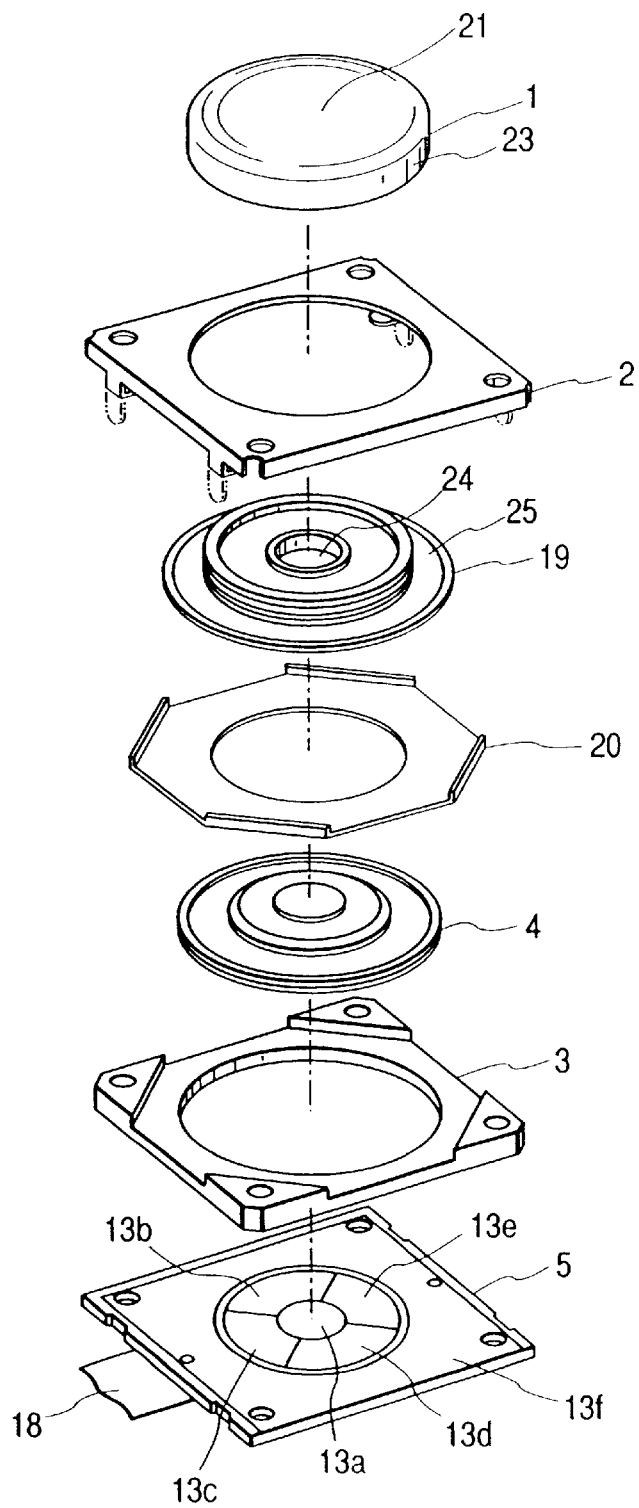
FIG. 16 is an exploded perspective view of the above input device.

FIGS. 14 to 16 are for explaining an input device according to a seventh embodiment. FIG. 14 is a sectional view of the input device, FIG. 15 is a perspective view of the input device and FIG. 16 is an exploded perspective view of the input device.

The input device is essentially comprised of a key top 51, housing 52, a support member 53, elastic body 54, printed wiring board 55, slider 69 and bracket 70.

The key top 51 is molded to a shape shown in FIG. 14 from an elastic material such as rubber or elastomer and an input operation surface 71 which is greatly depressed in a circular arc is formed on the center portion of the top surface. As shown in FIG. 14, a projection portion 72 which is thinner than the peripheral portion and can move vertically is provided on the center portion in such a manner that it faces down and a lower end side wall 73 is mated with the slider 69.

The slider 69 is molded from a hard synthetic resin, a hole 74 which mates with the head portion of the elastic body 54 is formed in the center portion, and a connection portion between this slider 69 and the elastic body 54 is covered with the key top 51 mounted to the top of the slider 69. A flange portion 57 provided at the periphery of the slider 69 is sandwiched between the bracket 70 and the upper end bent portion 58 of the housing 52 in such a manner that it can slide.

Figure 19:
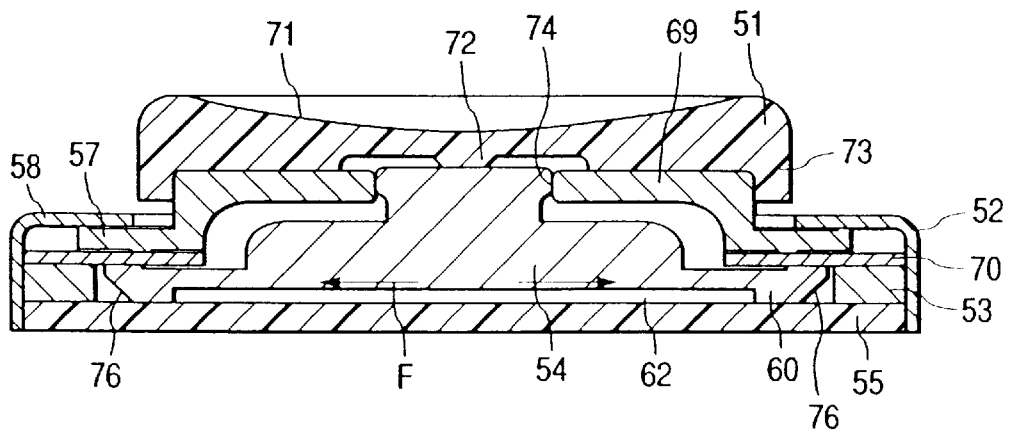
FIG. 19 is a sectional view of an input device according to a ninth embodiment of the present invention.

The whole elastic body 54 has conductivity and its head portion exposes from the hole 74 of the slider 69 and contacts or approaches the projection portion 72 of the key top 51 so that the elastic body 54 is fixed to a predetermined position of the printed wiring board 55. As shown in FIG. 19, first to fifth electrodes 63a to 63e and a gland electrode 63f are provided on the printed wiring board 55 and the first to fifth electrodes 63a to 63e face the under surface of the elastic body 54 with a space 62 therebetween.

When the key top 51 of this input device is operated, the peripheral portion (slider 69) of the key top 51 is prevented from moving in a vertical direction (Z direction) and allowed to move only in a horizontal direction (X and Y directions) because the flange portion 57 of the slider 69 which mates with the key top 51 is sandwiched between the bracket 70 and the upper end bent portion 58 of the housing 52.

When the key top 51 is moved in a horizontal direction, this movement is transmitted to the elastic body 54 through the slider 69, the elastic body 54 is elastically deformed, the spaces 62 between the elastic body 54 and some of the second to fifth electrodes 63b to 63e are changed by this deformation, a change in capacitance is electrically detected, and a detection signal can be input.

When the center portion (projection portion 72) of the key top 51 is pressed in a vertical direction (Z direction) by the finger, the center portion of the elastic body 54 is pressed without the slider 69, the space between the first electrode 63a and the elastic body 54 is narrowed from the initial state, a change in capacitance is electrically detected, and a detection signal is input.

Figure 17:
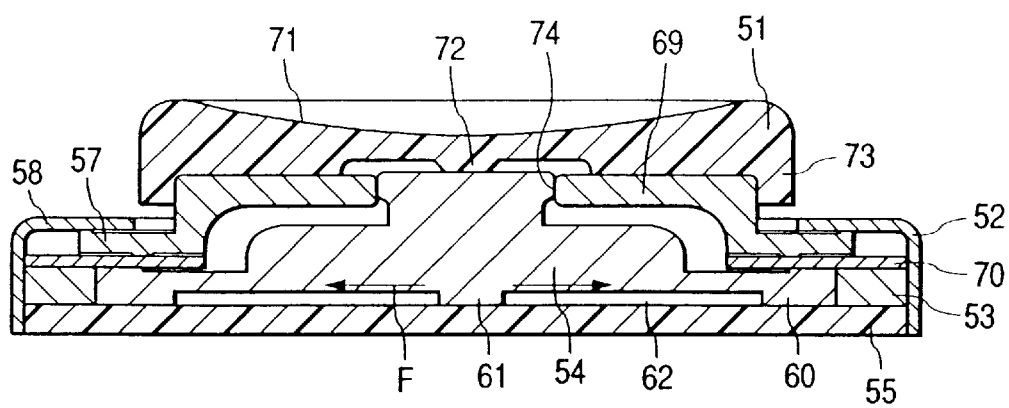
FIG. 17 is a sectional view of an input device according to an eighth embodiment of the present invention.
Figure 18:
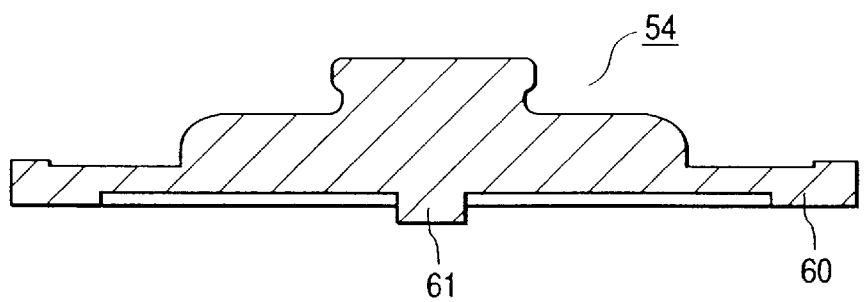
FIG. 18 is a sectional view of an elastic body used in the above input device.

FIG. 17 and FIG. 18 are for explaining an input device according to an eighth embodiment. FIG. 17 is a sectional view of the input device and FIG. 18 is a sectional view of an elastic body before it is set in the input device. The difference between the eighth embodiment and the seventh embodiment is the shape of the elastic body.

That is, a projection portion 61 is provided on the center portion of the under surface of the elastic body 54 and projects down slightly more than the peripheral portion 60. When the elastic body 54 is set in the device, the projection portion 61 is pressed and deformed by the printed wiring board 55 and the peripheral portion 60 is fixed to the printed wiring board 55 in this state, thereby generating tension (stress) shown by an arrow F in the elastic body 54.

Although the elastic body 54 is elastically deformed by operation force, as distortion remains in the elastic body 54, when operation force is very small, it may be offset with the residual distortion and an appropriate signal may not be input. When tension (stress) is applied to the elastic body 54 as in this embodiment, even if operation force is very small, an appropriate signal can be input. The projection portion 61 provided on the conductive elastic body 54b shown in FIG. 11 takes part in the application of tension (stress) to the conductive elastic body 54b.

FIG. 19 is for explaining an input device according to a ninth embodiment. In this embodiment, an inclined or round cutout portion 76 is provided at the periphery of the under surface of the elastic body 54. When this elastic body 54 is set in the device, the cutout portion 76 is smashed by pressure at the time of assembly (FIG. 19 does not illustrate the smashed cutout portion 76), thereby generating tension (stress) F in the elastic body 54. Since tension (stress) F is generated in the elastic body 54 by the cutout portion 76, the thickness of the peripheral portion of the elastic body 54 is designed to be larger than the thickness of the support member 53 by the smashed portion of the cutout portion 76.

Figure 20:
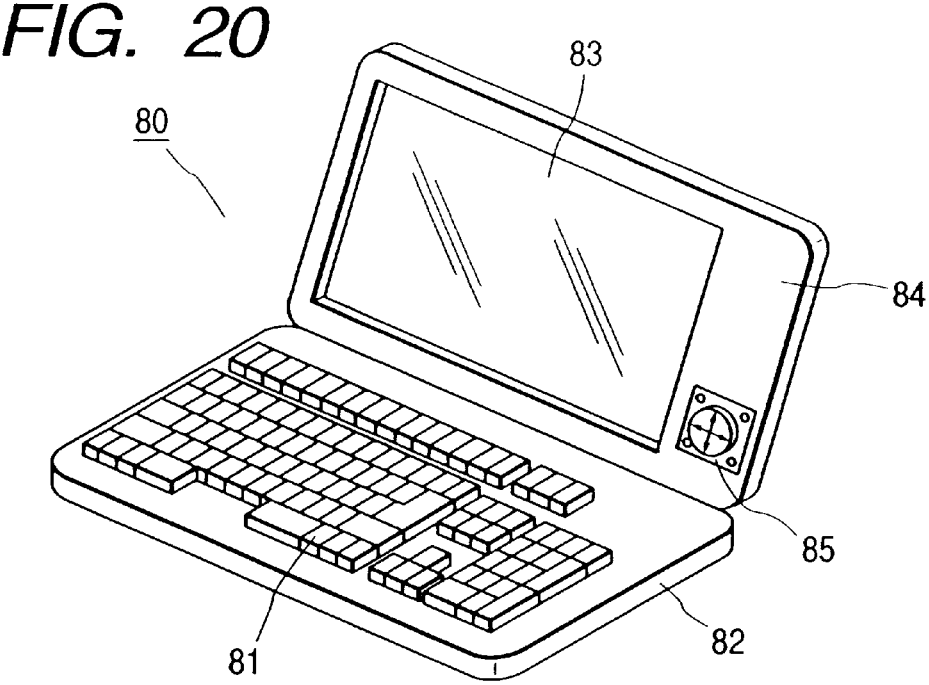
FIG. 20 is a perspective view of a personal computer comprising the input device according to the above embodiment of the present invention.
Figure 21:
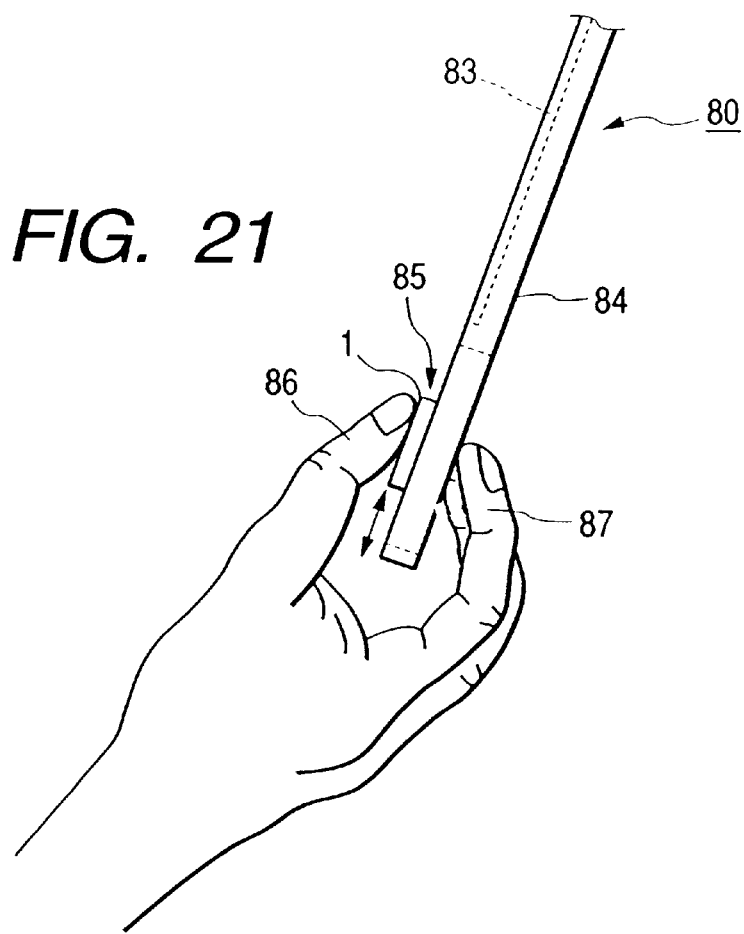
FIG. 21 is a partial side view showing the operation state of the input device in the above personal computer.

FIG. 20 and FIG. 21 show a first application example of the input device in a mobile personal computer or a notebook personal computer. The personal computer 80 comprises a personal computer body 82 having a large number of key board switches 81 and a cover member 84 having a display portion 83, and the cover member 84 is attached to the personal computer body 82 such that it can move. The above input device 85 is incorporated in the end portion of the cover member 84 as an input pointer. In this example, the input device 85 is incorporated in the cover member 84 but can be incorporated in the personal computer body 82.

FIG. 21 shows the operation state of the input device 85. A cursor on the display portion 83 can be moved by sandwiching the input device 85 between the thumb 86 and another finger 87 and moving the thumb 86 vertically and horizontally.

Figure 22:
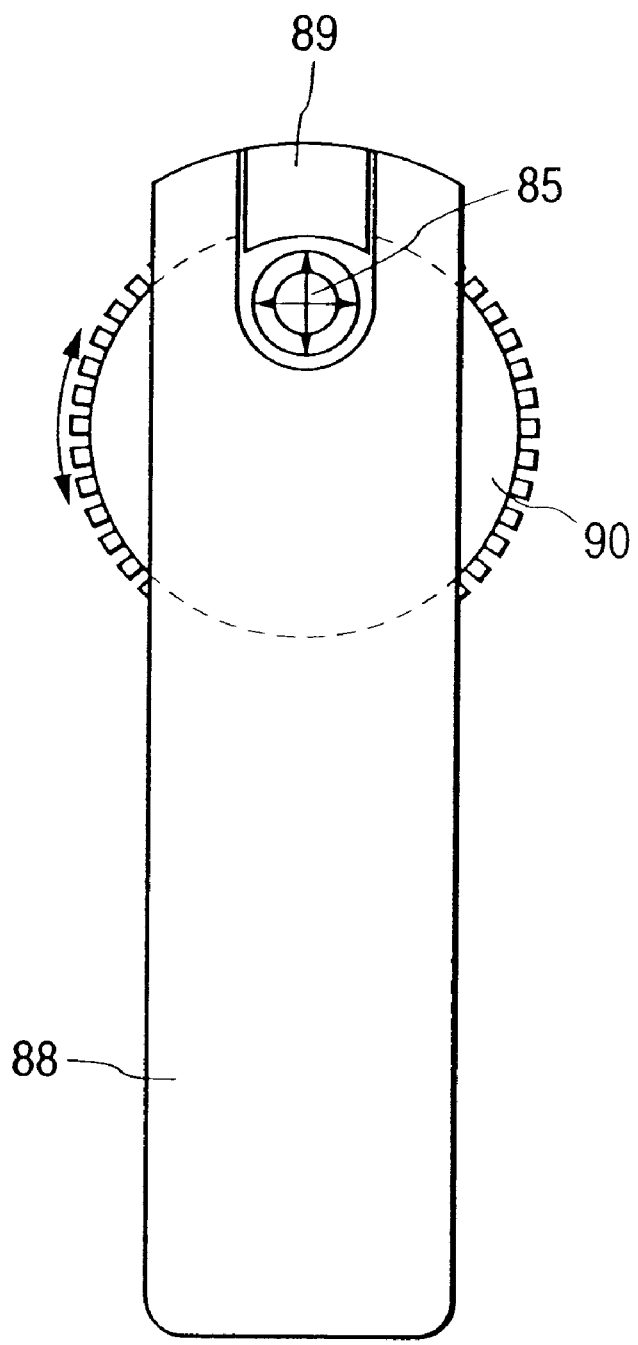
FIG. 22 is a plan view of a remote controller comprising the input device according to the embodiment of the present invention.

FIG. 22 shows a second application example of the input device in a remote controller for a mobile personal computer or notebook personal computer for domestic use. The above input device 85 as an input pointer, switch 89 and scroll dial 90 are incorporated in a remote control body 88. While the remote controller for a personal computer has been described in this example, the present invention can be applied to a remote controller for other apparatus.

Although the input device is used in a personal computer in the above examples, it may be used in such fields as electric appliances, car equipment, measuring instruments and medical appliances.

Although five different separate electrodes are used in the above embodiments, the number of separate electrodes may be smaller than that in the above embodiments.

While the input device has been described in the above embodiments, the present invention is not limited to this and is applicable to a detection device for detecting deformation as a change in capacitance by installing a detector on a portion corresponding to the key top or slider of the input device in such a manner it can move (slide or rotate), moving the detector by action force (force, magnetic force or wind force) from an object to be detected, and deforming an elastic body by this movement.

Since the present invention is constituted as described above, comprises a slider movable only in a horizontal direction, a key top movable in a vertical direction and a pressing body and clearly distinguishes input in a horizontal direction from input in a vertical direction, and the pressing body is hard, it can provide an input device and a detection device which have high input accuracy (detection accuracy) and excellent handling ease.

Since the present invention has a tension application means of applying tension to the elastic body, input can be made with small force and input accuracy (detection accuracy) can be further improved.

Since the connection portion between the elastic body and the slider is covered with the top key in the present invention, dust does not adhere to or enter the connection portion, thereby making it possible to improve operation reliability.

What is claimed is:

1. An input device comprising:
    separate electrodes comprised of an electrode for detecting input in a vertical direction and a plurality of electrodes for detecting input in a horizontal direction and arranged separately on a surface;
    an elastic body which faces the separate electrodes with a predetermined space therebetween, at least a portion opposite to the separate electrodes being conductive, a thin portion being provided opposite to the electrode for detecting input in the vertical direction, a storage depressed portion being formed on the thin portion, and the space between the elastic body and the separate electrodes changing by input;
    a slider connected to the elastic body and movable only in the horizontal direction;
    a hard pressing body stored in the storage depressed portion of the elastic body; and
    a key top whose portion opposite to the pressing body is movable in the vertical direction, wherein
        horizontal movement of the key top deforms the elastic body via the slider and a space between the conductive portion of the elastic body and the electrodes for detecting input in the horizontal direction changes, and
        when the key top is pressed, the thin portion of the elastic body deforms through the pressing body and the space between the thin portion and the electrode for detecting input in the vertical direction changes.

2. The input device of claim 1 which has tension application means of applying tension to the elastic body.

3. The input device of claim 1, wherein a connection portion between the elastic body and the slider is covered with the key top.

4. An input device comprising:
    separate electrodes comprised of an electrode for detecting input in a vertical direction and a plurality of electrodes for detecting input in a horizontal direction and arranged separately on a surface;
    an elastic body which faces the separate electrodes with a predetermined space therebetween, at least a portion opposite to the separate electrodes being conductive, and the space between the elastic body and the electrodes changing by input;
    a slider connected to the elastic body and movable only in the horizontal direction; and
    a key top whose portion opposite to the electrode for detecting input in the vertical direction is movable at least in the vertical direction through the elastic body, wherein
        horizontal movement of the key top deforms the elastic body via the slider and a space between the conductive portion of the elastic body and the electrodes for detecting input in the horizontal direction changes, and
        when the key top is pressed, the elastic body deforms and a space between the conductive portion of the elastic body and the electrode for detecting in the vertical direction changes.

5. The input device of claim 4 which has a tension application means of applying tension to the elastic body.

6. The input device of claim 4, wherein a connection portion between the elastic body and the slider is covered with the key top.

7. An input device comprising:

separate electrodes comprised of an electrode for detecting input in a vertical direction and a plurality of electrodes for detecting input in a horizontal direction and arranged separately on a surface;

an elastic body which faces the separate electrodes with a predetermined space therebetween, at least a portion opposite to the separate electrodes being conductive, and the space between the elastic body and the electrodes changing by input;

a slider connected to the elastic body and movable only in the horizontal direction; and a key top whose portion opposite to the electrode for detecting input in the vertical direction is movable at least in the vertical direction through the elastic body, wherein horizontal movement of the slider deforms the elastic body via the key top and a space between the conductive portion of the elastic body and the electrodes for detecting input in the horizontal direction changes, and when the key top is pressed, the elastic body deforms and a space between the conductive portion of the elastic body and the electrode for detecting in the vertical direction changes.

* * * * *

UNITED STATES PATENT AND TRADEMARK OFFICE
CERTIFICATE OF CORRECTION

PATENT NO. : 6,508,137 B2  Page 1 of 1
DATED : January 21, 2003
INVENTOR(S) : Katsutoshi Suzuki It is certified that error appears in the above-identified patent and that said Letters Patent is hereby corrected as shown below:

Column 11,
Line 3, delete "claim 4," and substitute -- claim 5, -- in its place.

Signed and Sealed this

Seventeenth Day of June, 2003

JAMES E. ROGAN
*Director of the United States Patent and Trademark Office*